Figure 1:
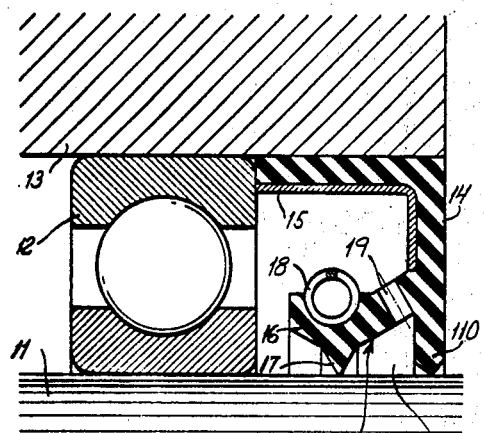

United States Patent
Malmstrom

[15] 3,685,838
[45] Aug. 22, 1972

[54] SEAL BETWEEN TWO PARTS, ONE OF WHICH IS ROTATABLE IN RELATION TO THE OTHER

[72] Inventor: Sven Erik Malmstrom, Reftele, Sweden

[73] Assignee: Forsheda Gummifabrik AB, Forsheda, Sweden

[22] Filed: Nov. 21, 1969

[21] Appl. No.: 878,616

[30] Foreign Application Priority Data

Nov. 21, 1968 Sweden .................. 15827/68

[52] U.S. Cl. ...................... 277/25, 277/75, 277/82, 308/187.1
[51] Int. Cl. ............................................. F16j 15/16
[58] Field of Search .......... 277/81, 82, 89, 95, 75, 25, 277/3, 15, 133; 308/187.1

[56] References Cited

UNITED STATES PATENTS

| | | | |
|---|---|---|---|
| 2,270,054 | 1/1942 | Hogan | 277/95 X |
| 3,044,786 | 7/1962 | Chillson | 277/75 X |
| 3,421,768 | 1/1969 | Ludwig | 277/25 |

FOREIGN PATENTS OR APPLICATIONS

| | | | |
|---|---|---|---|
| 170,393 | 12/1959 | Sweden | 308/187.1 |
| 1,553,413 | 12/1968 | France | 277/25 |

*Primary Examiner*—Robert I. Smith
*Attorney*—Howson and Howson

[57] ABSTRACT

A seal for at least a pair of relatively rotatable members for preventing lubricant from leaking from a lubricant chamber to the space outside the lubricant chamber comprising a first seal element having a sealing portion mounted on the rotatable member and adapted to bear against a contact surface on the other member to form a primary seal area supporting the lubricant chamber from the space outside the lubricant chamber characterized by the first seal element mounted on the rotatable member having a bore therein forming a duct connecting the lubricant chamber with the space outside the lubricant chamber, said bore being located radially to one side of the primary seal area so that lubricant bypassing the primary seal area will be discharged through the bore to the lubricant chamber under the influence of centrifugal force.

9 Claims, 7 Drawing Figures

PATENTED AUG 22 1972 3,685,838

INVENTOR:
SVEN ERIK MALMSTRÖM
Howson & Howson
ATTYS.

SEAL BETWEEN TWO PARTS, ONE OF WHICH IS ROTATABLE IN RELATION TO THE OTHER

The present invention relates to a seal between two parts, one of which is stationary and the other rotatable. The object of the seal is to prevent oil on the so called "oil side" from leaking to the other side, the "air side." In the main, the seal comprises two components, one of which is preferably provided with a rubber lip, and the other with a sealing wall, bearing against a contact surface facing the said lip. The components form a primary seal at the said contact surface which seal thus separates the oil side from the air side. Seals of this design thus include the majority of types of both radial and axial seals of lip design most commonly in use. The features distinguishing a seal according to the invention from seals known per se, are as follows:

Behind the primary seal, as seen from the oil side, the rotatable part has been bored through, thus forming a duct connecting the air side with the oil side. The hole is so located that oil, possibly leaking through to the air side under the influence of the centrifugal force, will be thrown back to the oil side.

With the object of specifying the invention more in detail, a number of representative embodiments are described below in conjunction with the attached drawing.

FIGS. 1–7 show cross sections of sealing arrangements adapted to seal a bearing house against leakage of oil contained therein.

In FIG. 1, the numeral 11 denotes a shaft, 12 a ball bearing, and 13, a bearing house. In the sealing case illustrated in FIG. 1, the shaft 11 is stationary whereas the housing revolves. The numeral 14 denotes a cuff type packing ring of rubber fitted into the bearing house by pressure. The packing ring is provided with a sheet metal stiffener 15. A sealing lip 16 bears against the shaft 11 with its sealing edge 17. For the purpose of compensating any possible setting in the rubber and in order to ensure constant pressure, the lip 16 is encircled by a coil spring 18. A duct 19 through the lip 16 forms a connection between the oil side and the air side. The duct or bore 19 is preferably of a size larger than about 0.5 millimeters and less than about 4 millimeters. The packing ring 14 is also fitted with an additional sealing lip 110 which bears against the shaft 11 and forms a secondary sealing arrangement. An annular space 111, connected with the oil side through the duct 19, is thus formed between the lip 110 and the sealing edge 17. The seal according to FIG. 1 functions as follows:

Oil possibly escaping past the sealing edge 17 will be thrown outwards by the revolving sealing lip 16 and then follow the tapered wall 112, in the direction of the duct 19, where it is thrown back into the oil side by centrifugal force.

Figure 2:
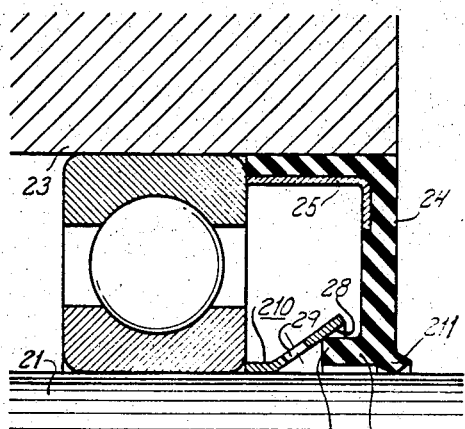

FIG. 2 shows a somewhat different design in which the shaft 21 is the rotating component, whereas the bearing house 23 is stationary. Into the bearing house has been pressed a packing ring 24 of rubber, stiffened by means of a metal ring 25. The inside portion of the packing ring is provided with a cylindrical inward-directed lip 26, the edge 27 of which bears against a tapered sealing surface 28 of a sheet metal ring 210 embracing the shaft and likewise provided with a hole 29. The embodiment according to FIG. 2 is also equipped with a secondary seal which includes a sealing lip 211 bearing against the shaft. On rotation of the shaft, and consequently also the sheet metal ring 210, any oil possibly leaking out, will be thrown back to the oil side by centrifugal force through the hole 29.

Figure 3:
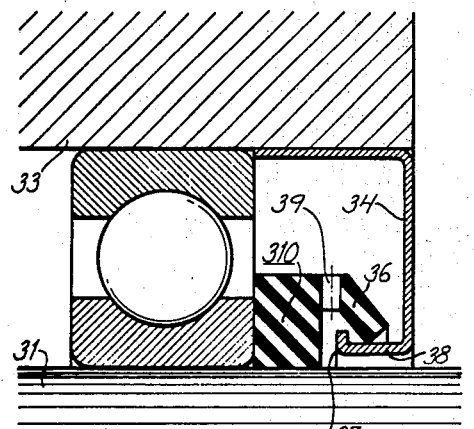

FIG. 3 illustrates a sealing arrangement differing from that shown in FIG. 2 by the sheet metal ring 210 having been substituted by a rubber ring 310 mounted on the shaft 31 which ring, by means of an inward-directed lip 36 bears against the cylindrical surface 38 of a profiled sheet metal ring 34, fitted by pressure into the bearing house 33. In the intermediate portion between the rubber ring 31 and the lip 36 has been formed a duct 39, the object of which — similarly to the embodiments described above — is to return any oil possibly having leaked past the primary seal between the lip 36 and the cylindrical surface 38. A flange 37, extending from the cylindrical surface 38, prevents leaking oil from coming into contact with the shaft 31.

Figure 4:
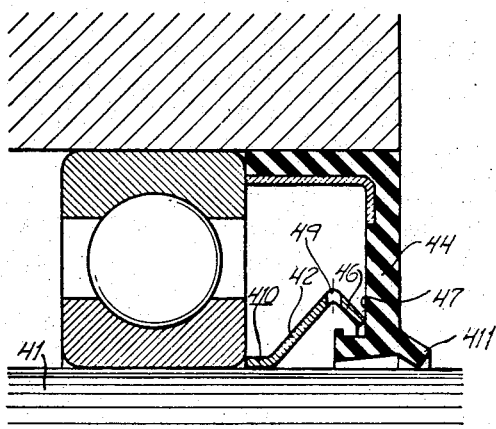

The sealing arrangement according to FIG. 4 includes a packing ring of rubber 44, and a metal ring 410, press-fitted on to the shaft 41 including in principle, two funnel-shaped portions 42 and 46 facing each other. At the intermediate portion between these two tapered parts 42 and 46 there is provided a punched hole 49. With its free edge, the funnel-shaped portion 46 bears against the internal annular and plane limiting surface 47 of the packing ring and forms a primary seal at this point. Possibly leaking oil will be thrown outwards by centrifugal force, and is returned to the oil side through the hole 49. The embodiment according to FIG. 4 is also provided with a secondary seal 411, the object of which is to prevent dirt and foreign particles from passing from the air side to the oil side through the hole 49.

Figure 5:
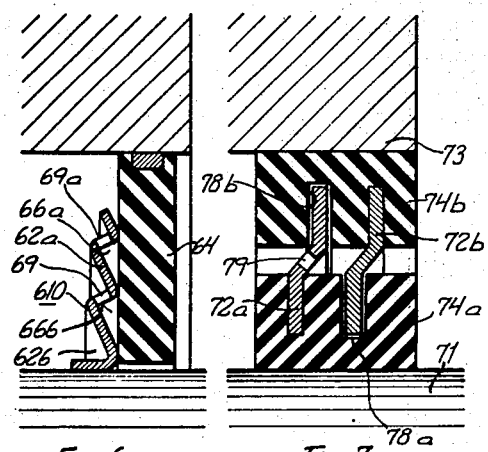

The seal according to FIG. 5 differs from the above (FIG. 4) only by the packing ring 54 being provided with a sealing lip 56 which, by means of an outwardly directed sealing edge 57, forms a primary seal against a cylindrical surface 58 of a sheet metal ring 510. This latter ring is also provided with a hole 59, located radially outside the sealing surface 58. The idea of this feature is to increase the centrifugal force, and thus create a more efficient throwing effect in the event of a possible leaking of oil.

Figure 6:
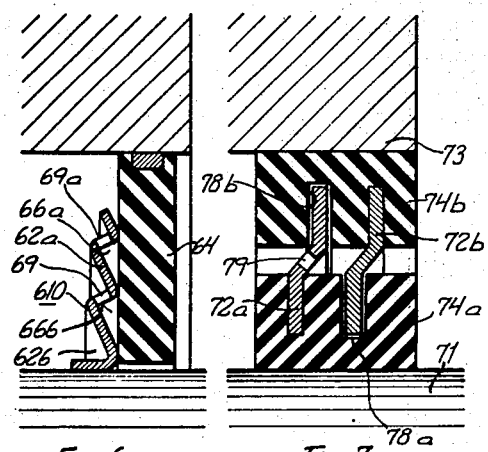

The sealing arrangement according to FIG. 6 comprises principally a rubber disc 64 pressed into the bearing house, the said disc being adapted to bear against a sheet metal ring 610 along circular lines and possibly be composed of a number of tapered 62 a and b, and 66 a and b, facing each other. The holes 69 a and b have been bored through the tapered rings 66 a and b. The purpose of these holes is identical with that already described in connection with FIGS. 1 – 5, i.e., to return leaking oil by centrifugal force to the oil side of the seal in the event of a leakage.

Figure 7:
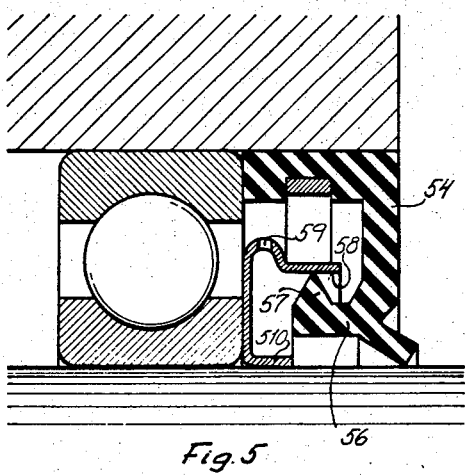

FIG. 7, finally, illustrates an arrangement comprising two rubber rings, one of which, 74 a, is fitted by pressure to the shaft 71, and the other, 74 b, is inserted into the bearing house 73 under tension. Two identical metal washers, 72 a and 72 b, have been pressed into grooves provided in the respective rubber rings 74 a and 74 b and 72 a with its inner portion, and 72 b with its outer portion. The metal rings are composed of an external and an internal annular part, joined to a tapered portion. In its tapered part, the metal ring 72 a is provided with a hole 79 having the same purpose as that described above in connection with the other embodiments. Jointly with the grooves 78 a and 78 b in the packing rings 74 a and 74 b, the outer and inner annular portions, respectively, of the metal rings 72 a and 72 b, form labyrinths or possibly friction seals. In the embodiments described above, the bore or duct 29 of FIG. 2, 39 of FIG. 3, 49 of FIG. 4, 59 of FIG. 5, 69 of FIG. 6, and 79 of FIG. 7 are all preferably in the same size range as that set forth in connection with FIG. 1; that is, of a size larger than about 0.5 millimeters and less than about 4 millimeters.

What is claimed is:

1. A seal adapted to be mounted between a shaft member engageable in a housing member, the members being mounted for relative rotation, comprising a first seal element mounted on one of said members, a second seal element, said sealing elements combining to define a lubricant chamber and another chamber connected at its radially outermost portion to said lubricant chamber, at least a portion of said lubricant chamber being disposed radially outwardly of said other chamber, said chambers being connected by a bore of a size which is larger than about 0.5 millimeters and less than bout 4 millimeters in cross section whereby lubricant from said lubricant chambers which may bypass said seal elements to said other chamber will be discharged through said bore to said lubricant chamber under the influence of centrifugal force.

2. A seal as claimed in claim 1 wherein said seal is a resilient member mounted in the housing having a radial lip comprising one of said seal elements engaging the shaft and an offset lip comprising the other seal element projecting angularly from said radial lip having a sealing edge engaging the shaft at an area axially removed from said radial lip and defining therebetween the other chamber and wherein said bore is disposed in one of said seal elements.

3. A seal as claimed in claim 2 including a coil spring maintaining one of said sealing edge in engagement with the shaft.

4. A seal as claimed in claim 1 wherein said first seal element comprises a resilient member mounted in the housing having a sealing lip engaging the shaft and said second seal element comprises a metallic ring mounted on said shaft engaging said first seal element to define therebetween the other chamber and wherein said bore is disposed in said metallic ring.

5. A seal as claimed in claim 4 wherein said metallic ring includes two funnel-shaped portions and said bore is disposed at the apex between said funnel-shaped portions.

6. A seal as claimed in claim 4 wherein said second sealing element comprises a metallic ring of zig-zag cross section and including a plurality of bores in said metallic ring.

7. A seal as claimed in claim 4 wherein said first seal comprises a resilient ring member having a first lip engaging the shaft and a second radially inwardly directed lip portion and wherein said second seal element comprises a metallic ring mounted on the shaft having a generally cylindrical portion engaging said sealing lip and formed to define said other chamber therebetween and wherein the bore is disposed in said metallic ring.

8. A seal as claimed in claim 1 wherein said first seal elements consists of a profiled sheet metal ring mounted in the housing having a cylindrical surface spaced from the shaft and said second seal element comprises a resilient rubber ring mounted on the shaft having a sealing lip engaging said cylindrical surface and wherein said bore is disposed at the juncture of said sealing lip and said sealing ring.

9. A seal as claimed in claim 1 including a pair of rubber rings mounted in the housing and on the shaft respectively radially spaced apart to define an annular space therebetween, and wherein each of said rings is provided with at least one circumferentially extending groove and wherein said second seal element comprises at least one metallic ring engaging in the grooves of the rings, said bore being disposed in said metallic ring in the annular space between said resilient rings.

* * * * *

UNITED STATES PATENT OFFICE
CERTIFICATE OF CORRECTION

Patent No. 3,685,838    Dated August 22, 1972

Inventor(s) SVEN-ERIK MALMSTROM

It is certified that error appears in the above-identified patent and that said Letters Patent are hereby corrected as shown below:

Column 2, line 52; "tapered 62a" should read --tapered rings 62a--

Signed and sealed this 10th day of July 1973.

(SEAL)
Attest:

EDWARD M. FLETCHER, JR.  
Attesting Officer

Rene Tegtmeyer  
Acting Commissioner of Patents